United States Patent [19]

Khare et al.

[11] Patent Number: 5,439,867
[45] Date of Patent: Aug. 8, 1995

[54] FLUIDIZABLE SULFUR SORBENT AND FLUIDIZED SORPTION PROCESS

[75] Inventors: Gyanesh P. Khare; Bryan W. Cass, both of Bartlesville, Okla.

[73] Assignee: Phillips Petroleum Company, Bartlesville, Okla.

[21] Appl. No.: 206,300

[22] Filed: Mar. 4, 1994

[51] Int. Cl.⁶ .......................... B01J 20/08; B01J 20/10
[52] U.S. Cl. ..................... 502/407; 502/414; 502/415
[58] Field of Search ............. 502/407, 415, 238, 250, 502/342, 343, 414

[56] References Cited

U.S. PATENT DOCUMENTS

| | | | |
|---|---|---|---|
| 3,771,261 | 11/1973 | Mandelik et al. | 48/214 |
| 3,844,734 | 10/1974 | Johnson | 48/213 |
| 4,029,752 | 6/1977 | Cahn | 423/563 |
| 4,044,114 | 8/1977 | Dezael et al. | 423/574 |
| 4,081,253 | 3/1978 | Marion | 48/197 R |
| 4,088,736 | 5/1978 | Courty et al. | 423/230 |
| 4,175,928 | 11/1979 | Britton et al. | 48/197 R |
| 4,287,050 | 9/1981 | Eastman et al. | 208/215 |
| 4,313,820 | 2/1982 | Farha, Jr. et al. | 208/213 |
| 4,333,855 | 6/1982 | Gardner et al. | 252/439 |
| 4,371,458 | 2/1983 | Eastman et al. | 252/439 |
| 4,371,507 | 2/1983 | Farha, Jr. et al. | 423/230 |
| 4,371,728 | 2/1983 | Farha, Jr. et al. | 585/258 |
| 4,376,698 | 3/1983 | Gardner et al. | 208/215 |
| 4,389,304 | 6/1983 | Eastman et al. | 208/254 H |
| 4,389,305 | 6/1983 | Gardner et al. | 208/254 H |
| 4,988,490 | 1/1991 | Nicholas et al. | 423/351 |
| 5,045,522 | 9/1991 | Kidd | 502/237 |
| 5,155,086 | 10/1992 | Thakur et al. | 502/342 |
| 5,157,201 | 10/1992 | Norris | 585/820 |
| 5,202,057 | 4/1993 | Nicholas et al. | 252/376 |

*Primary Examiner*—Anthony McFarlane
*Attorney, Agent, or Firm*—C. W. Stewart

[57] ABSTRACT

Provided is an improved process for removing hydrogen sulfide from fluid streams by contacting a hydrogen sulfide contaminated fluid stream with a novel fluidizable sorbent composition comprising zinc oxide, alumina and silica. Further provided is a novel method for producing a fluidizable sorbent composition containing zinc oxide, alumina and silica.

18 Claims, No Drawings

FLUIDIZABLE SULFUR SORBENT AND FLUIDIZED SORPTION PROCESS

This invention relates to an improved process for removing hydrogen sulfide from fluid streams. In another aspect, this invention relates to a composition suitable for use in such process. A further aspect of this invention relates to an improved method for the manufacture of a sulfur sorbent suitable for use in the removal of hydrogen sulfide from fluid streams.

The removal of sulfur from fluid streams can be desirable or necessary for a variety of reasons. If the fluid stream is to be released as a waste stream, removal of sulfur from the fluid stream can be necessary to meet the sulfur emission requirements set by various air pollution control authorities. Such requirements are generally in the range of about 10 ppm to 500 ppm of sulfur in the fluid stream. If the fluid stream is to be burned as a fuel, removal of sulfur from the fluid stream can be necessary to prevent environmental pollution. If the fluid stream is to be processed, removal of the sulfur is often necessary to prevent the poisoning of sulfur sensitive catalysts or to satisfy other process requirements.

Traditionally, sulfur sorbents used in processes for the removal of sulfur from fluid streams have been agglomerates utilized in fixed bed applications. Because of the various process advantages from the use of fluidized beds, it can be desirable to utilize a fluidized bed of zinc oxide based sorbent in the removal of sulfur components from fluid streams. There are, however, a number of problems associated with the development of the use of fluidized beds in sulfur sorption that, prior to the discovery of the invention described herein, have not been resolved. Particularly, conventional methods for the production of fluidizable materials have necessarily required spray drying techniques in order to obtain particle sizes in the fluidizable range and to obtain the sufficiently spherically shaped particles thought to be necessary for fluidization. Spray drying techniques, however, have drawbacks due to their relatively high cost and comparatively low production capacity. It would be desirable to have a method for economically producing a fluidizable sorbent material without resort to costly spray drying techniques and to utilize the advantages of a fluidized bed in the removal of sulfur compounds from sulfur-containing fluid streams.

It is thus an object of the present invention to provide a novel method for economically producing a fluidizable sulfur sorbent material without resort to the use of a spray drying technique.

Another object of this invention is to provide a process for removing hydrogen sulfide from a fluid stream utilizing a fluidized bed of sorbent material.

In accordance with one aspect of the present invention, there is provided a particulate fluidizable sorbent having a mean particle size in the range of from about 20 micrometers to about 500 micrometers and comprising alumina, silica and zinc oxide.

In accordance with another aspect of the invention, there is provided a method of making a fluidizable, zinc oxide based sorbent material. This method includes mixing appropriate proportions of alumina, silica and zinc oxide to form a mixture. The mixture is impregnated with an aqueous solution of a nickel containing compound to form an impregnated mixture. The impregnated mixture is agglomerated followed by granulation to provide a granulated material suitable for use as a fluidizable material.

Another aspect of the invention is a process for removing hydrogen sulfide from a fluid stream containing hydrogen sulfide by contacting the fluid stream with a fluidizable, zinc oxide based sorbent material, and recovering a stream having a concentration of hydrogen sulfide lower than that of the hydrogen sulfide containing fluid stream. The fluidizable, zinc oxide based sorbent material can be a fluidizable sorbent comprising particulates having a mean particle size in the range of from about 20 micrometers to about 500 micrometers and comprising alumina, silica and zinc oxide.

The fluidizable, zinc oxide based sorbent material used in the hydrogen sulfide sorption process include those produced by the novel method for making such sorbent material which includes the step of mixing appropriate proportions of alumina, silica and zinc oxide to form a mixture. The mixture is impregnated with an aqueous solution of a nickel containing compound to form an impregnated mixture. The impregnated mixture is agglomerated followed by granulation to produce a granulated material suitable for use as fluidizable material.

Other objects and advantages of the invention will be apparent from the foregoing description of the invention and the appended claims as well as from the detailed description of the invention which follows.

The novel sorption composition described herein is a fluidizable material capable of being fluidized within a fluidization zone when contacted by a lifting gas. Thus, it is critical for the sorption composition to have certain physical properties in order for it to be both fluidizable and able to remove, by a sorption mechanism, hydrogen sulfide from a fluid stream containing hydrogen sulfide. It has been discovered that the method described herein produces a zinc oxide based sorbent material that has the properties necessary for fluidization.

In the manufacture of the fluidizable material, the primary components of alumina, silica and zinc oxide are combined together in appropriate proportions by any suitable manner which provides for the intimate mixing of the components to provide a substantially homogeneous mixture. A binder can also be incorporated as a component into the mixture formed during the mixing step. Such a binder can be any suitable material that provides binding properties including those selected from the group consisting of calcium aluminate, bentonite, kaolin, colloidal silica, sodium silicate and any two or more thereof. The amount of binder used in the mixing step can be such as to provide a binder concentration in the mixture of from about 1 to about 20 weight percent of the total weight of the mixture, and, preferably, from 5 to 20 weight percent.

Any suitable means for mixing the sorbent components can be used to achieve the desired dispersion of the materials. Many of the possible mixing means suitable for use in the inventive process are described in detail in *Perry's Chemical Engineers' Handbook, Sixth Edition*, published by McGraw-Hill, Inc., at pages 19-14 through 19-24, which pages are incorporated herein by reference. Thus, suitable mixing means can include, but are not limited to, such devices as tumblers, stationary shells or troughs, muller mixers, which are either batch type or continuous type, impact mixers, and the like. It is preferred to use a muller mixer in the mixing of the silica, alumina and zinc oxide components.

Once the sorbent components are properly mixed, the mixture is impregnated with a promoter or a precursor of a promoter such as a metal oxide compound or a precursor of a metal oxide compound. Examples of suitable metal oxides include the oxides of molybdenum, tungsten, one or more metals selected from Group VIII of the Periodic Table, and any other metal that is known to have hydrogenation ability of the type necessary to reduce sulfur oxide species to hydrogen sulfide.

The metal oxide promoter may be added to the mixture in the form of the elemental metal, metal oxide, and/or metal-containing compounds that are convertible to metal oxides under calcining conditions. Some examples of such metal-containing compounds include metal acetates, metal carbonates, metal nitrates, metal sulfates, metal thiocyanates, and mixtures of two or more thereof. In a preferred embodiment of the present invention, the absorbing composition is promoted with a precursor of nickel oxide such as nickel nitrate.

The elemental metal, metal oxide, and/or metal-containing compounds can be added to the mixture by impregnation of the mixture with a solution, either aqueous or organic, that contains the elemental metal, metal oxide, and/or metal-containing compound.

In the method of making the fluidizable sorbent composition, the mixture of alumina, silica and zinc oxide can be impregnated with an aqueous solution of a metal promoter prior to agglomeration followed by granulation. The method can also include the impregnation of an agglomerate of the mixture of alumina, silica, and zinc oxide with the aqueous solution of the metal oxide followed by granulation. Another alternative includes the impregnation of the granulate formed by the granulation of an agglomerate of the mixture of alumina, silica, and zinc oxide with the aqueous solution of the metal oxide. If the metal oxide is nickel oxide or a precursor of nickel oxide, it is preferred to perform the impregnation step after the granulation step.

The impregnation solution is any aqueous solution and amount of such solution which suitably provides for the impregnation of the mixture of alumina, silica and zinc oxide to give an amount of metal promoter in the final zinc oxide based sorbent composition having the concentration of metal promoter as described elsewhere herein. Therefore, the aqueous solution can include a promoter metal compound that is both soluble in water and is a metal oxide or a metal oxide precursor. The concentration of the promoter metal-containing compound in the aqueous solution can be in the range of from about 0.1 grams of promoter metal-containing compound per gram of water to about 2 grams of promoter nickel-containing compound per gram of water. Preferably, the weight ratio of promoter metal-containing compound to water in the aqueous solution can be in the range of from about 0.5:1 to about 1.5:1 but, most preferably, it is in the range of from 0.75:1 to 1.25:1.

The metal oxide promoter will generally be present in the zinc oxide based sorbent composition in an amount ranging from about 0.1 weight-% to about 15 weight-%, and will more preferably be in the range of about 2.0 weight-% to about 12.0 weight-%, most preferably about 10.0 weight-%, said weight-%'s being expressed in terms of the metal oxide based upon the total weight of the absorbing composition.

One of the desirable and unexpected aspects of the invention is that no special and expensive method of agglomeration is used to form the agglomerate that is subsequently granulated to form a fluidizable material. Prior to the discovery of the novel and unexpected method described herein, those skilled in the art of producing fluidizable materials believed that, in order to produce such a fluidizable material, expensive spray-drying techniques were required. However, the present inventive method utilizes agglomerating, without spray drying, followed by granulating to form a sorbent material having the critical properties necessary for fluidizability.

Any means suitable for forming an agglomerate of the impregnated mixture can be utilized, provided that no spray drying techniques are used to form the agglomerate. The agglomerate can be formed by such methods as molding, tabletting, pressing, pelletizing, extruding, tumbling and densifying. The preferred method of agglomeration is by densification.

Various approaches can be used in performing the preferred densification of the mixture. In the preferred of these methods, the powdered components are placed in the bowl of a kneader or muller mixer of which the bowl and blades are rotated while simultaneously adding either water or, preferably, an aqueous acid solution, to the mixture to form a paste. The aqueous acid solution can have an acid concentration of from about 0.1 to about 10 weight percent acid selected from the group consisting of HCl, $H_2SO_4$, $HNO_3$ and $CH_3COOH$. The amount of water or aqueous acid solution added to the mixture during densification can generally be in the range of from about 20 to about 60 weight percent of the resultant slurry or paste, but, preferably, it can be in the range of from 30 to 50 weight percent.

The paste produced by the densification method is dried at a temperature in the range of from about 150° F. to about 350° F. to form a dried agglomerate. The dried agglomerate can also be calcined at a temperature in the range of from about 400° F. to about 1500° F. and, preferably, in the range of from 800° F. to 1300° F.

The final step in the method of making a fluidizable, zinc oxide based sorbent material includes the grinding, crushing or granulating of the agglomerate so as to produce a granulated material having the critical physical properties necessary for a fluidizable material. Any suitable means for granulating the agglomerate into particles having physical properties which provide for a fluidizable material can be used. Many of the granulating means or grinding means or crushing means suitable for use in the inventive process are described in detail in the aforementioned *Perry's Chemical Engineers' Handbook, Sixth Edition* at pages 8-20 through 8-48, which pages are incorporated herein by reference. Thus, suitable grinding, granulating or crushing means can include such devices as crushers, mills, shredders, and cutters. The preferred apparatus for the size reduction of the agglomerate into fluidizable particles include mills.

One critical aspect of the inventive processes or methods described herein is the necessary requirement that the fluidizable, zinc oxide based sorbent material be particulate material having a mean particle size in the range from about 20 micrometers to about 500 micrometers. Preferably, the particles can have a mean size in the range from about 40 micrometers to about 400 micrometers and, most preferably, the particle size can be in the range from 100 to 300 micrometers.

When referring herein to the term "mean particle size" of the fluidizable material, the term shall mean the size of the particulate material as determined by using a RO-TAP Testing Sieve Shaker, manufactured by W. S. Tyler Inc., of Mentor, Ohio, or other comparable sieves. The material to be measured is placed in the top of a nest of standard eight inch diameter stainless steel frame sieves with a pan on the bottom. The material undergoes sifting for a period of about 10 minutes; thereafter, the material retained on each sieve is weighed. The percent retained on each sieve is calculated by dividing the weight of the material retained on a particular sieve by the weight of the original sample. This information is used to compute the mean particle size.

One of the many unexpected aspects of this invention is that it is an unnecessary requirement for the granulated material to be substantially spherical in shape in order for it to be fluidizable. But, due to the method by which the granulated material is produced, the particles of granulated material are not necessarily spherical in shape. Rather, such particles will ordinarily be irregular or random shaped particles, therefore, not substantially spherical. The surprising aspect of this invention is that the aforementioned irregular or random shaped particles, or non-spherically shaped particles, can suitably be used as a fluidized bed material within a fluidization zone. This is possible only due to the unique combination of physical properties of the sorbent matrix or material imparted by such properties as the density and hardness of the mixture, specific components of the mixture, and the size of the particulate material.

Another embodiment of the invention includes a drying step whereby the agglomerate is dried prior to granulating the thus-dried agglomerate. The agglomerate can be dried prior to granulation preferably at a temperature generally in the range of from about 150° F. to about 575° F. and, more preferably, in the range of from about 200° F. to about 500° F., for a period of time of at least about 0.5 hours but, generally, in the range of from about 0.5 hour to about 4 hours and, more preferably, in the range of from about 1 hour to about 3 hours.

The dried agglomerate can also be calcined in the presence of oxygen at a temperature suitable for achieving the desired degree of calcination, for example, generally in the range of from about 700° F. to about 1600° F. and, more preferably, in the range of from about 900° F. to about 1400° F. The calcination step is conducted for a period of time suitable for achieving the desired degree of calcination, for example, generally in the range of from about 0.5 hour to about 4 hours and, more preferably, in the range of from about 1 hour to about 3 hours to produce a material for granulation.

The starting alumina component of the composition can be any suitable commercially available alumina material including colloidal alumina solutions and, generally, those alumina compounds produced by the dehydration of alumina hydrates. A preferred alumina is boehmite alumina. The alumina can also contain minor amounts of other ingredients, such as, for example, 1–10 weight percent silica, which do not adversely affect the quality of the final composition, but it is generally desirable to have an essentially pure alumina as a starting material for the composition of this invention. The starting alumina can be made in any manner well known in the art, examples of which are described at length in Kirk-Othmer *Encyclopedia of Chemical Technology,* 3rd Edition, Vol. 2, pp. 218–240. As an example, a suitable commercially available starting alumina for use in the composition of this invention is manufactured by Vista Corporation, designated as Catapal® and Dispal® aluminas.

The zinc oxide used in the preparation of the absorbing composition can either be in the form of zinc oxide, or in the form of one or more zinc compounds that are convertible to zinc oxide under the conditions of preparation described herein. Examples of such zinc compounds include zinc sulfide, zinc sulfate, zinc hydroxide, zinc carbonate, zinc acetate, and zinc nitrate. Preferably, the zinc oxide is in the form of powdered zinc oxide.

The silica used in the preparation of the absorbing composition may be either in the form of silica, or in the form of one or more silicon compounds that are convertible to silica under the conditions of preparation described herein. Any suitable type of silica may be used in the absorbing composition employed in the process of the present invention. Examples of suitable types of silica include diatomite, silicalite, silica colloid, flame-hydrolyzed silica, hydrolyzed silica, and precipitated silica, with diatomite being presently preferred. Examples of silicon compounds that are convertible to silica under the conditions of preparation described herein include silicic acid, sodium silicate, and ammonium silicate. Preferably, the silica is in the form of diatomite.

The zinc oxide will generally be present in the sorbent composition in an amount in the range of about 10 weight-% to about 90 weight-%, and will more preferably be in the range of about 30 weight-% to about 90 weight-%, and will most preferably be in the range of about 40 weight-% to about 60 weight-%, when said weight-%'s are expressed in terms of the zinc oxide based upon the total weight of the sorbent composition.

The silica will generally be present in the sorbent composition in an amount in the range of about 5 weight-% to about 85 weight-%, and will more preferably be in the range of about 20 weight-% to about 60 weight-%, when said weight-%'s are expressed in terms of the silica based upon the total weight of the sorbent composition.

The alumina will generally be present in the sorbent composition in an amount in the range of about 5.0 weight-% to about 30 weight-%, and will more preferably be in the range of about 5.0 weight-% to about 15 weight-%, when said weight-%'s are expressed in terms of the weight of the alumina compared with the total weight of the sorbent composition.

The process of the present invention is a sorption process for removing sulfur compounds from a gaseous stream containing therein such sulfur compounds, which particularly include hydrogen sulfide. A fluid stream containing hydrogen sulfide is contacted with the sorbent composition of the present invention under suitable sorption conditions to substantially reduce the concentration of hydrogen sulfide of the fluid stream without significantly increasing the concentration of sulfur dioxide therein.

It is believed that the hydrogen sulfide is being absorbed by the sorption composition and thus the terms "sorption process" and "sorption composition", or like terms, are utilized for the sake of convenience. However, the exact chemical phenomenon occurring is not the inventive feature of the process of the present invention and the use of the terms "sorption", "sorbent", or like terms in any form are not intended to limit the present invention.

The chemical changes that are believed to occur in the sorption composition during this cyclic process are summarized in the following equations:

$$ZnO + H_2S \rightarrow ZnS + H_2O \quad (I)$$

$$ZnS + \text{Oxygen} \rightarrow ZnO + SO_x \quad (II)$$

The sorption composition of the present invention may be utilized to remove hydrogen sulfide from any suitable gaseous stream. The hydrogen sulfide may be produced by the hydrodesulfurization of organic sulfur compounds or may be originally present in the gaseous stream as hydrogen sulfide. Examples of such suitable gaseous streams include light hydrocarbons such as methane, ethane and natural gas; gases derived from petroleum products and products from extraction and/or liquefaction of coal and lignite; gases derived from tar sands and shale oil; coal derived synthesis gas; gases such as hydrogen and nitrogen; gaseous oxides of carbon; steam and the inert gases such as helium and argon. Gases that adversely affect the removal of hydrogen sulfide and which should be absent from the gaseous streams being processed are oxidizing agents, examples of which include air, molecular oxygen, the halogens, and the oxides of nitrogen.

One feature of the inventive sorption process includes contacting a fluid or gaseous stream containing a concentration of hydrogen sulfide with a fluidized bed of the sorption composition described herein and contained within a fluidization zone. The fluidization zone can be defined by any apparatus or equipment which can suitably define such fluidization zone including, for example, a vessel. The contacting gaseous stream serves as the lifting gas to provide for fluidization. The lift gas will flow upwardly through the bed of sorbent material at a rate such that the frictional resistance equals the weight of the bed. The velocity of the lift gas or fluidization gas should be sufficient to provide for the required fluidization of the sorbent, but, generally can range from about 0.1 ft/sec to about 25 ft/sec. More preferably, the velocity of the fluidization gas through the fluidization zone can range from about 0.15 ft/sec to about 20 ft/sec and, most preferably, the fluidization velocity can range from 0.175 ft/sec to 15 ft/sec.

The process conditions within the fluidization zone are such that a portion, preferably a substantial portion, of the hydrogen sulfide concentration in the fluidization gas stream is reduced by the sorption mechanism or the removal of the hydrogen sulfide from the fluidization gas stream by the sorbent composition. Such suitable sorption process conditions include a process temperature in the range of from about 500° F. to 2000° F. Preferably, the contacting temperature can be in the range of from about 600° F. to about 1800° F. and, more preferably, it can be in the range of from 700° F. to 1700° F.

Any suitable pressure can be utilized for the processes of the present invention. The pressure of the gaseous feed stream being treated is not believed to have an important effect on the absorption process of the present invention, and will generally be in the range of from about atmospheric to about 2,000 psig during the treatment.

The hydrogen sulfide concentration of the fluid stream to be treated and serving as the fluidization gas or lift gas will generally be in the range of from about 200 ppmv upwardly to about 20,000 ppmv. Particularly, the hydrogen sulfide concentration can range from about 300 ppmv to about 10,000 ppmv, and, preferably, from about 500 ppmv to about 5,000 ppmv.

The treated stream exiting the fluidization zone shall have a concentration of hydrogen sulfide below that of the stream entering the fluidization zone. Thus, the concentration of hydrogen sulfide in the treated stream can be less than about 200 ppmv. Most preferably, the concentration is less than about 150 ppmv and, most preferably, it is less than 100 ppmv.

The following examples are presented in further illustration of the invention.

Example I

Absorbent A was prepared by mixing in a mix-muller, 145.6 g of Vista Chemical Dispal 180 alumina, 462.4 g diatomite silica, and 575.6 g of zinc oxide for 10 minutes. The well-mixed powder was impregnated with 335.6 g of nickel nitrate dissolved in 281 g of deionized water over a period of 3 minutes and the resulting mixture further mixed for 10 minutes. Another 68.7 g of deionized water was added to make the mix "wet." The wet paste was agglomerated by drying for 16 hours in a draft oven at 316° F. The dried agglomerates were granulated in a bench top Stokes Pennwalt Granulator (Model 43, Stokes Pennwalt, Warminster, Pa., fitted with a 40 mesh screen). The product was screened through 50 and 140 mesh screens and calcined at 1175° F. for one hour.

In a typical preparation, Absorbent B was prepared by first dry mixing 452 g of diatomite and 568 g of zinc oxide in a mix-muller for 15 minutes. While still mixing, 575 g of Nyacol Al-20 colloidal alumina solution was added to the powder and the paste further mixed for 25 minutes. The paste was then agglomerated by drying at 300° F. for 1 hour and calcining at 1175° F. for 1 hour. The agglomerates were granulated using Stokes Pennwalt Granulator fitted with a 40 mesh screen. The granulated powder was impregnated with 29.7 g of nickel nitrate dissolved in 24.8 g of deionized water per 100 g of powder. The impregnated power was again dried at 300° F. for 1 hour and calcined at 1175° F. for 1 hour.

The physical and chemical characteristics of Absorbents A and B are included in Table I. The attrition data presented in Tables I and III were obtained by using a procedure similar to that described in U.S. Pat. No. 4,010,116, which is incorporated herein by reference. Instead of using an attrition index, however, a percent attrition is reported. Percent attrition represents the amount of material lost as fines (due to attrition) at the end of 5-hr tests. The values reported in Tables I and III may be compared with a commercial FCC (fluid cracking catalyst) catalyst used in petroleum refinery crackers. One such catalyst, Davison Chemicals' GXP-5, under the same test conditions yielded 4.59% attrition.

TABLE I

| Physical Properties | Absorbent A | Absorbent B |
| --- | --- | --- |
| Particle Size Distribution, % | | |
| >297 microns | 0.4 | 0.0 |
| 149 microns | 78.0 | 65.1 |
| 105 microns | 19.5 | 22.7 |
| 88 microns | 1.9 | 6.9 |
| 74 microns | 0.1 | 4.8 |
| 53 microns | 0.0 | 0.5 |
| <53 microns | 0.0 | 0.0 |
| Bulk Density, g/cc | 0.90 | 1.01 |
| % Attrition (5-hr test) | 19.4 | 14.1 |

Example II

To test the efficacy of the new fluidizable absorbents, Absorbent B was subjected to a standard absorption test in which the absorbent was alternately contacted with a hydrogen sulfide ($H_2S$)-containing gaseous stream and regeneration air. The hydrogen sulfide-containing gas is mixed with the inert gases of carbon dioxide ($CO_2$) and nitrogen ($N_2$) and during the absorption step the absorbent is loaded with sulfur to form ZnS. Air is used to regenerate the sulfur-laden absorbent to its original ZnO form during the regeneration step. The reactor temperatures for the two steps were respectively 800° F. and 1100° F. The sulfur loading on the absorbent was determined to be complete when hydrogen sulfide was detected at 100 ppm in the effluent stream, at that point the sulfided material was regenerated in air.

The test data for Absorbent B are included in Table II. These data clearly show that the absorbents of this invention are highly effective in sulfur removal. Even after 13 cycles of operation, the amount of sulfur removed at breakthrough was quite high.

TABLE II

Hydrogen Sulfide Absorption Test Results Absorbent B

| Cycle # | Sulfur Loading |
| --- | --- |
| 1 | 15.4 |
| 2 | 14.4 |
| 3 | 13.7 |
| 4 | 13.4 |
| 5 | 13.0 |
| 6 | 12.7 |
| 7 | 12.7 |
| 8 | 12.5 |
| 9 | 12.5 |
| 10 | 12.2 |
| 11 | 12.0 |
| 12 | 11.8 |
| 13 | 11.7 |

Absorbent B was tested in a transport fluid bed reactor test unit at room temperature, using air as lifting gas, to determine its fluidizing ability and attrition resistance. The reactor unit consists of a riser (a central tube) 23 ft high that is jacketed with an annulus.

The sorbent is fluidized in the riser and circulated between riser and the annulus tubes. In this test, 10 lbs of sorbent were introduced into the annulus and fluidized with air flowing through the riser (up flow) at a linear velocity of 15 ft/sec. The fluidization air was controlled at 0.2 ft/sec in the annulus. This created a solid bed height of about 50 inches in the annulus and a solid circulation rate of 250 lb/hr. The average riser bed density was 6 lb/cu ft. Later in the test, an additional 11 lbs of sorbent were added to the annulus to increase solid bed height to 105 inches and the solid circulation to 590 lb/hr. Thus, in a 4.5 hour test, the absorbent was fluidized at a linear gas velocity of 15–25 ft/sec and the rate of solid carryover to the downstream dust collector was only 0.4 weight %. This demonstrates that the attrition rate is extremely low thereby indicating the durability of the absorbent.

During the test, the transport fluidized bed system remained very stable indicating exceptionally good fluidization characteristics for the sorbent. Thus, the absorbent of this invention is highly durable, has low attrition and excellent fluidizing ability even though the absorbent particles are not substantially spherical, which in the prior art was thought to be a requirement in order for the material to be suitable for use in a fluidized bed reactor.

Hydrogen sulfide absorption/sorbent regeneration tests were carried out in a similar transport fluidized reactor test unit additionally having high temperature and high pressure capability. In this test unit, the riser is 30 ft in height. Thirty-four lbs of absorbent were charged into the reactor. The fluidization gas in the annulus was maintained at about 0.175 ft/sec while the gas velocity through the riser was set at 15 ft/sec. The absorption was carried out at 1000° F. and 100 psia. The absorption test was started with 500 ppmv $H_2S$ in nitrogen feed and incrementally raised to 8,000 ppm when the breakthrough occurred after about 42 hours on stream. The fully sulfided sorbent contained 15.7 wt % sulfur at breakthrough.

The sulfided sorbent was regenerated using a mixture of air/nitrogen at 65 psia and 1200° F. The gas linear velocity was 15 ft/sec. It took 4 hours for the complete regeneration. The sulfur content of the absorbent was reduced from 15.7 wt % sulfur to 0.05 wt % sulfur indicating a successful regeneration.

Physical and chemical characteristics of Absorbent B in Fresh, sulfided and regenerated states are included in Table III. From this data, it is concluded that the absorbents of this invention are highly durable, have excellent fluidization ability, low attrition rate and are highly effective in sulfur removal from fluid streams. It is noted that the absorbents, after sulfiding and regeneration, have essentially the same particle size distribution as the fresh absorbent. This shows the material to be durable and hard with low attrition. Surprisingly, the sulfided and regenerated sorbents have a lower percent attrition than the fresh sorbent indicating that instead of becoming "soft" during fluid bed operation, they actually become "harder." Furthermore, the attrition rate is now comparable to a commercial FCC catalyst.

The used sorbent from the pilot fluid bed reactor was also tested in the standard lab test for 13 cycles. The results obtained from the testing of the used sorbent are shown in Table IV. These data suggest that the hydrogen sulfide removal efficiency of the sorbent is as good or better after it had been subjected to a harsh, pilot fluidized reactor operation.

TABLE III

Properties of Fresh, Sulfided, and Regenerated Fluid Bed Absorbent B

| Physical Properties | Absorbent B Fresh | Absorbent B Sulfided | Absorbent B Regenerate |
| --- | --- | --- | --- |
| Particle Size Distribution, % | | | |
| >297 Microns | 0.0 | 0.0 | 0.0 |
| 149 microns | 65.1 | 70.4 | 63.5 |
| 105 microns | 22.7 | 17.7 | 18.9 |
| 88 microns | 6.9 | 5.5 | 7.1 |
| 74 microns | 4.8 | 3.5 | 4.9 |
| 53 microns | 0.5 | 2.8 | 5.1 |
| <53 microns | 0.0 | 0.1 | 0.5 |
| Bulk Density, g/cc | 1.01 | 1.32 | 1.23 |
| % Attrition (5-hr test) | 14.1 | 5.4 | 4.3 |

TABLE IV

Hydrogen Sulfide Absorption Test Results
Absorbent B

| Cycle # | Fresh Sorbent | Used Sorbent |
|---|---|---|
| | Sulfur Loading | |
| 1 | 15.4 | 17.3 |
| 2 | 14.4 | 14.4 |
| 3 | 13.7 | 14.4 |
| 4 | 13.4 | 14.6 |
| 5 | 13.0 | 14.2 |
| 6 | 12.7 | 14.2 |
| 7 | 12.7 | 14.0 |
| 8 | 12.5 | 14.0 |
| 9 | 12.5 | 13.5 |
| 10 | 12.2 | 13.7 |
| 11 | 12.0 | 13.5 |
| 12 | 11.8 | 13.4 |
| 13 | 11.7 | 13.4 |

Reasonable variations and modifications are possible within the scope of this disclosure without departing from the scope and spirit thereof.

That which is claimed is:

1. A method of making a zinc oxide based sorbent composition suitable for use in a fluidized bed, the steps comprising:
    mixing alumina, silica and zinc oxide to form a mixture;
    impregnating said mixture with an aqueous solution of a promoter metal-containing compound to form an impregnated mixture;
    agglomerating said impregnated mixture to form an agglomerate; and
    granulating said agglomerate so as to produce a granulated material suitable for use as a fluidizable material in said fluidized bed.

2. A method as recited in claim 1 wherein said granulated material has a mean particle size in the range of from about 20 micrometers to about 500 micrometers.

3. A method as recited in claim 2 wherein said aqueous solution has a concentration of said promoter metal-containing compound in the range of from about 0.1 grams of said promoter metal-containing compound per gram of water to about 2.0 grams of said promoter metal-containing compound per gram of water.

4. A method as recited in claim 3, further comprising: prior to the granulating step, drying said agglomerate at a temperature in the range of from about 150° F. to about 575° F. for a period of time of at least about 0.5 hours followed by calcining at a temperature in the range of from about 700° F. to about 1600° F. for a period of time of from about 0.5 hour to about 4 hours.

5. A method as recited in claim 4 wherein said zinc oxide based sorbent composition comprises alumina in the amount in the range of from about 5 weight percent to about 30 weight percent; silica in the amount in the range of from about 5 weight percent to about 85 weight percent; and zinc oxide in the amount in the range of from about 10 weight percent to about 90 weight percent.

6. A method of making a zinc oxide based sorbent composition suitable for use in a fluidized bed, the steps comprising:
    forming an agglomerate containing alumina, silica and zinc oxide;
    impregnating said agglomerate with an aqueous solution of a promoter metal-containing compound to form an impregnated mixture; and
    granulating said impregnated mixture so as to produce a granulated material suitable for use as a fluidizable material in said fluidized bed.

7. A method as recited in claim 6 wherein said granulated material has a mean particle size in the range of from about 20 micrometers to about 500 micrometers.

8. A method as recited in claim 7 wherein said aqueous solution has a concentration of said promoter metal-containing compound in the range of from about 0.1 grams of said promoter metal-containing compound per gram of water to about 2.0 grams of said promoter metal-containing compound per gram of water.

9. A method as recited in claim 8, further comprising: drying said agglomerate at a temperature in the range of from about 150° F. to about 575° F. for a period of time of at least about 0.5 hours followed by calcining at a temperature in the range of from about 700° F. to about 1600° F. for a period of time of from about 0.5 hour to about 4 hours.

10. A method as recited in claim 9 wherein said zinc oxide based sorbent composition comprises alumina in the amount in the range of from about 5 weight percent to about 30 weight percent; silica in the amount in the range of from about 5 weight percent to about 85 weight percent; and zinc oxide in the amount in the range of from about 10 weight percent to about 90 weight percent.

11. A method of making a zinc oxide based sorbent composition suitable for use in a fluidized bed, the steps comprising:
    forming an agglomerate containing alumina, silica and zinc oxide;
    granulating said agglomerate so as to produce a granulated material suitable for use as a fluidizable material in said fluidized bed; and
    impregnating said agglomerate with an aqueous solution of a promoter metal-containing compound to form an impregnated mixture.

12. A method as recited in claim 11 wherein said granulated material has a mean particle size in the range of from about 20 micrometers to about 500 micrometers.

13. A method as recited in claim 12 wherein said aqueous solution has a concentration of said promoter metal-containing compound in the range of from about 0.1 grams of said promoter metal-containing compound per gram of water to about 2.0 grams of said promoter metal-containing compound per gram of water.

14. A method as recited in claim 13, further comprising: drying said agglomerate at a temperature in the range of from about 150° F. to about 575° F. for a period of time of at least about 0.5 hours followed by calcining at a temperature in the range of from about 700° F. to about 1600° F. for a period of time of from about 0.5 hour to about 4 hours.

15. A method as recited in claim 14 wherein said zinc oxide based sorbent composition comprises alumina in the amount in the range of from about 5 weight percent to about 30 weight percent; silica in the amount in the range of from about 5 weight percent to about 85 weight percent; and zinc oxide in the amount in the range of from about 10 weight percent to about 90 weight percent.

16. A fluidizable sorbent, comprising:
    a particulate having a mean particle size in the range of from about 20 micrometers to about 500 micrometers and consisting essentially of alumina, silica, and zinc oxide.

17. A fluidizable sorbent as recited in claim 16 wherein said zinc oxide is present in an amount in the range of from about 10 weight percent to about 90 weight percent, said silica is present in an amount in the range of from about 5 weight percent to about 85 weight percent, and said alumina is present in an amount in the range of from about 5 weight percent to about 30 weight percent.

18. A fluidizable sorbent as recited in claim 17 wherein said mean particle size is in the range of from about 40 micrometers to about 300 micrometers.

* * * * *